TEMPERATURE COMPENSATION OF PHOTOCONDUCTIVE DETECTORS

Filed Feb. 28, 1963

EDGAR O. DIXON
*INVENTOR.*

BY J. M. St. Amand
ATTORNEY

United States Patent Office 3,363,105

Patented Jan. 9, 1968

3,363,105

TEMPERATURE COMPENSATION OF PHOTOCONDUCTIVE DETECTORS

Edgar O. Dixon, East Woodstock, Conn., assignor, by mesne assignments, to the United States of America as represented by the Secretary of the Navy Filed Feb. 28, 1963, Ser. No. 261,914
4 Claims. (Cl. 250—206)

The present invention relates to electronic circuitry for use with photoconductive detectors, and more particularly to circuitry that provides for the approximate compensation of photoconductive detectors for changes in both responsivity and response time with changes in temperature.

It is known that it is possible to approximately compensate for changes in responsivity with temperature of a photoconductive detector, such as the PbS or PbSe types for example, with a resistive network using a thermally sensitive resistance with a negative temperature coefficient. However, it is also known that the response time of a photoconductive detector will change with temperature in such a way that the detector response at high frequencies tends to remain constant with temperature while the detector response at lower frequencies tends to increase with decreasing temperatures.

It is an object of the invention to provide an electronic circuit for maintaining a photoconductive detector response approximately constant.

It is also an object of the invention to provide electronic circuitry to correct for the increase in the response of a photoconductive detector, at lower frequencies, with decreasing temperature.

It is a further object of the invention to provide an electronic circuit that provides for the approximate compensation of photoconductive detectors for changes in both responsivity and response time with changes in temperature.

Other objects and many of the attendant advantages of this invention will become readily appreciated as the same becomes better understood by reference to the following detailed description when considered in connection with the accompanying drawings wherein.

Figure 1:
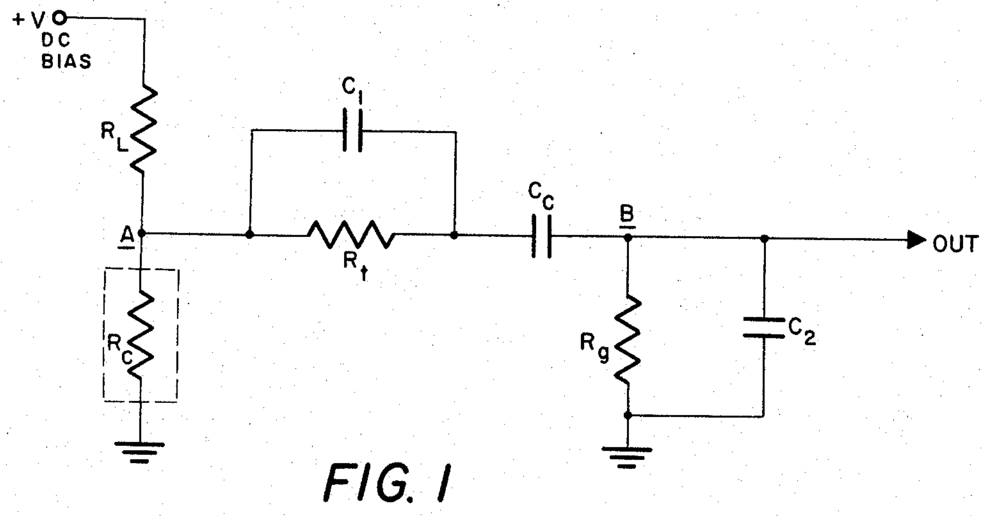
FIG. 1 is a circuit diagram of an embodiment of the invention.

In FIG. 1 the component $R_c$ refers to a photoconductive detector cell whose responsivity and response time functions are compensated by the circuitry that follows for changes in detector temperature. Resistor $R_L$ is a load resistor commonly employed with a photoconductive detector and its D.C. bias voltage, V, to produce a voltage at point A which changes with changes in incident energy on the detector $R_c$.

As shown in FIG. 1, by incorporating a capacitive network $C_1$ and $C_2$ with a resistive network $R_t$ and $R_g$, where $R_t$ is a thermally sensitive resistance with a negative coefficient, it is possible to approximately correct for changes in both detector responsivity and detector response time with temperature changes for the photoconductive detector $R_c$. Capacitance $C_c$ is a coupling capacitor which blocks the unchanging portion of the voltage at point A from the circuitry at point B and beyond, and passes only the voltage changes at A which are approximately proportional to the changes in incident energy on the detector $R_c$. Capacitance $C_c$ is made large enough, and its impedance small enough, so that it produces no other effect on the compensation circuitry and any circuitry beyond B, and therefore it may be neglected in any consideration of detector compensation.

One explanation of the operation of the combined network $R_t$, $C_1$, $R_g$ and $C_2$ is that $R_tC_1$ is a temperature-variable high (frequency) boost circuit, with the high boost rendered ineffective beyond the frequency range of interest by the network $R_gC_2$.

Another explanation of the operation of the combined network, is to think of $C_1$ and $C_2$ as a capacitive voltage divider that operates to provide at point B a fixed fraction of the signal voltage at point A for high frequencies, where $R_t$ and $R_g$ can be neglected. At low frequencies where the reactance of $C_1$ and $C_2$ are high enough to be neglected, the signal voltage at point B is determined by the temperature dependent voltage divider, $R_t$ and $R_g$, in such a way that the voltage tends to remain constant with temperature. The overall effect, then, is to provide a signal voltage at B that tends to remain constant with changes in both temperature and frequency, while the signal voltage at A is varying with both parameters.

Figure 2:
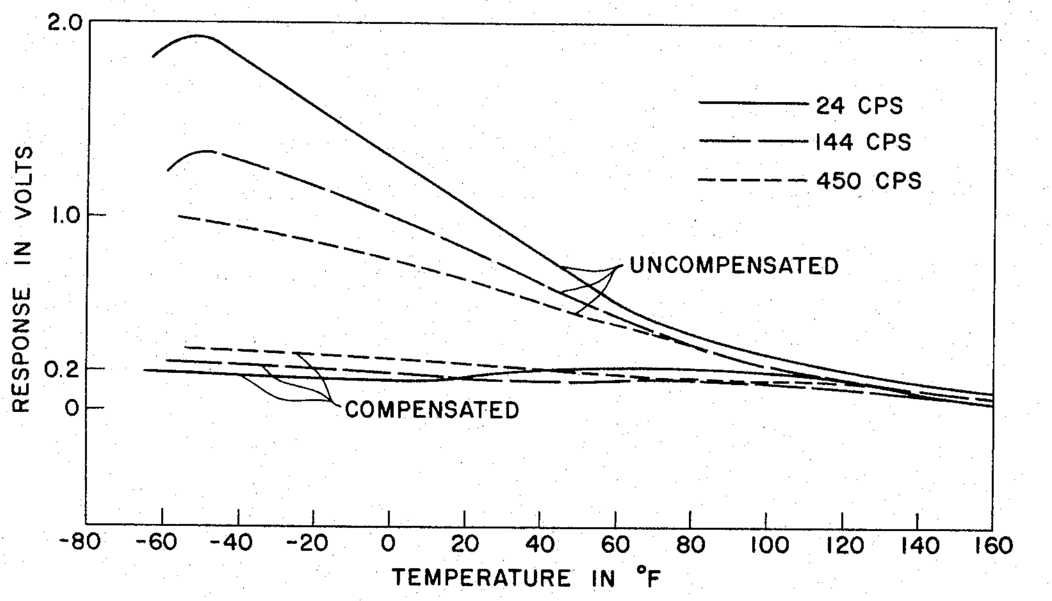
FIG. 2 shows graphs of responsivity vs. temperature for three frequencies of applied radiation, for both uncompensated and compensated circuitry.

The graphs of FIG. 2 illustrate typical cases of photoconductor response curves for both uncompensated and compensated circuitry.

Obviously, many modifications and variations of the present invention are possible in the light of the above teachings. It is therefore to be understood that within the scope of the appended claims the invention may be practiced otherwise than as specifically described.

What is claimed is:

1. An electronic circuit for compensation of photoconductive detectors for changes in responsivity and response time with changes in temperature, comprising:

(a) a photodetector cell,
(b) a first junction point,
(c) said photodetector cell connected between ground and said first junction point,
(d) a D.C. bias voltage supply,
(e) a load resistor connected between said D.C. bias voltage supply and said first junction point, for providing a voltage at said first junction point with respect to ground which is varied by changes in any incident energy impinging on said photodetector cell,
(f) a thermally sensitive resistor having one end thereof connected to said first junction point,
(g) a second junction point,
(h) a coupling capacitor connected between said second junction point and the other end of said thermally sensitive resistor,
(i) said coupling capacitor blocking any constant portion of the voltage at said first junction from any circuitry connected at said second junction and passing only any voltage changes occurring at said first junction, said voltage changes being proportional to the changes in incident energy impinging on said photodetector cell, and said coupling capacitance being of sufficiently large capacitance and small impedance that it produces no other effect on the circuitry and any circuitry connected to said second junction and is neglected in any consideration of detector compensation,
(j) a third resistor connected between said second junction point and ground,
(k) a second capacitor connected in parallel across said thermally sensitive resistor,
(l) a third capacitor connected in parallel across said third resistor.

2. A circuit as in claim 1 wherein said thermally sensitive resistor has a negative temperature coefficient.

3. A circuit as in claim 1 wherein said second and third capacitors operate as a capacitive voltage divider that operates to provide at said second junction point with respect to ground a fixed fraction of any signal voltage at said first junction point with respect to ground for high frequencies where the resistances of said thermally sensitive resistor and said third resistor are neglected, and at low frequencies where the reactances of said second and third capacitors neglected the signal voltage at said second junction point being determined by said thermally sensitive resistor and said third resistor which operate as a temperature dependent voltage divider, whereby the signal voltage at said second junction tends to remain constant with both frequency and temperature while the voltage at said first junction varies with both frequency and temperature.

4. A circuit as in claim 1 wherein said thermally sensitive resistor and said capacitor together operate as a temperature-variable high boost network with the high boost rendered ineffective outside the desired frequency range by the network formed by said third resistor and said third capacitor.

References Cited

UNITED STATES PATENTS

| | | | |
|---|---|---|---|
| 2,862,109 | 11/1955 | Kruper | 307—88.5 |
| 3,005,915 | 10/1961 | White et al. | 250—214 |
| 3,089,034 | 5/1963 | Meade | 250—83.3 |

RALPH G. NILSON, *Primary Examiner.*

MAYNARD R. WILBUR, *Examiner.*

J. D. WALL, *Assistant Examiner.*